United States Patent [19]
Weaver

[11] Patent Number: 5,467,887
[45] Date of Patent: Nov. 21, 1995

[54] EXPANDABLE END CLOSURE FOR RECLOSABLE PACKAGE

[75] Inventor: Edmund A. Weaver, Racine, Wis.

[73] Assignee: Kraft Foods, Inc., Northfield, Ill.

[21] Appl. No.: 286,750

[22] Filed: Aug. 5, 1994

[51] Int. Cl.⁶ .................................................. B65D 51/28
[52] U.S. Cl. .................. 220/212; 220/200; 229/125.06; 229/125.19; 229/160.2
[58] Field of Search .......................... 229/101.1, 101.2, 229/125.06, 125.19; 215/204, 216, 200, 326; 206/216, 425, 434; 220/181, 200, 212

[56] References Cited

U.S. PATENT DOCUMENTS

| | | |
|---|---|---|
| 1,912,385 | 6/1933 | Peterson . |
| 1,955,707 | 4/1934 | Greve ................................. 229/125.06 |
| 2,179,504 | 11/1939 | Hasbrook . |
| 2,185,353 | 1/1940 | Platt et al. . |
| 2,386,062 | 10/1945 | Roehrl . |
| 2,658,664 | 11/1953 | Hennessey ........................... 229/101.2 |
| 2,852,179 | 9/1958 | Bieler . |
| 3,062,428 | 11/1962 | Oettinger . |
| 3,302,855 | 2/1967 | Becker ............................... 229/101.2 X |
| 3,967,773 | 7/1976 | Kaufmann ........................... 229/101.2 X |
| 4,091,929 | 5/1978 | Krane . |
| 4,280,631 | 7/1981 | Lohrman ................................. 215/204 |
| 4,474,324 | 10/1984 | Forbes, Jr. . |
| 4,480,762 | 11/1984 | Thomas ................................ 215/216 X |
| 4,722,462 | 2/1988 | Zinnbauer . |
| 4,762,233 | 8/1988 | Sears et al. . |
| 4,801,075 | 1/1989 | Weber et al. . |
| 5,129,734 | 7/1992 | Van Erden . |
| 5,358,151 | 10/1994 | Strasenburgh ...................... 215/235 X |

FOREIGN PATENT DOCUMENTS 3118833  12/1982  Germany .

Primary Examiner—Stephen P. Garbe
Assistant Examiner—Robin A. Hylton
Attorney, Agent, or Firm—Fitch, Even, Tabin & Flannery

[57] ABSTRACT

An end closure for reclosable packages which is adapted for manual placement over an appropriately sized open package, container or box to substantially enclose a food product therein. The end closure comprises a substantially rectangular resilient end wall having side walls extending down perpendicularly therefrom at each edge. A thin, flexible, pleated sheet overlays the end wall and two opposing side walls. The two sidewalls include expansion joints, and the pleat is substantially coincident with the expansion joints, permitting the end closure to open against a bias when manual pressure is appropriately exerted. The end closure, when held open, therefore fits easily over the package opening. When the manual pressure is released, the end closure closes, forming a tight fit with the sides of the package, effectively protecting the food product from the environment. An end closure in accordance with the disclosed invention may be employed in conjunction with a tear-strip package of substantially uniform cross-section to provide a space-efficient package with a reusable closure as the package is reduced in size.

8 Claims, 8 Drawing Sheets

EXPANDABLE END CLOSURE FOR RECLOSABLE PACKAGE

BACKGROUND OF THE INVENTION

This invention relates generally to reclosable packaging for a food product, and more specifically to a flexible end closure for a package.

Reclosable packaging is generally employed to prevent or delay spoilage or desiccation of food products which are not likely to be completely consumed immediately after opening. Such packaging is thus often employed to protect food products which are sold in sufficiently large quantities to render immediate and complete use or consumption unlikely. In particular, reclosable packaging is appropriate for food products which are susceptible to quality deterioration resulting from exposure to the environment.

It is desirable for a reclosable package to be easy to open and reclose. This is a particularly important quality with regard to packaging for food products. Another desirable quality is space-efficiency. Whether a food product is typically stored in a refrigerator, a freezer or a pantry, it is desirable that the product not occupy more space than is necessary. Thus, a space-efficient package which may be reduced in volume as the quantity of food therein decreases may be appealing to consumers.

Among the numerous types of reclosable packages for food products is a tear-strip package. A tear-strip package is a size-adjustable package having a number of detachable parallel strips of material which may be sequentially removed to monotonically decrease the volume of the remaining package. Typically, reducing the size of a tear-strip package entails manually peeling a strip of material from around the perimeter of a container having a substantially uniform cross-section. Such packages can be seen in U.S. Pat. Nos. 2,852,179, entitled "Container", 4,762,233, entitled "Contracting Container", 4,091,929 entitled "Ice Cream Container", and 2,179,504, entitled "Food Product Package". A single lid can generally be used repeatedly as a closure for the package even as the package decreases in volume because the cross-section remains substantially uniform.

It is generally desirable that a lid for a reclosable package fit tightly, so that it will not be inadvertently dislodged during handling, and so that it will restrict or prevent exchange of air between the inside and outside of the package. However, a tight-fitting lid may be difficult to remove, and may be particularly difficult to reapply. Also, where the lid and package are made of a relatively thin, flexible material, one or both may become distorted after a period of time during which the lid has been removed and replaced repeatedly, thus making replacement of the lid difficult. There has been a need for improved reclosable packaging having a removable lid which is easily removed and replaced and which also provides a tight fit with the package.

SUMMARY OF THE INVENTION

The invention comprises a new and useful end closure of generally rectangular cross-section for manual placement over an appropriately sized open package, container or box. The end closure has an expandable opening which is movable between open and closed positions and is biased toward the closed position to enable the end closure to maintain a tight fit on its associated package while permitting placement over the end of the package without undue difficulty. In particular, the end closure preferably includes tabs which respond to manually applied pressure to enlarge its opening, facilitating application of the closure to a package. When the closure is in place and the pressure is released, the bias serves to constrict the opening of the closure tightly around the walls of the package, inhibiting the exchange of air and moisture between the package interior and the surrounding environment.

The end closure comprises a substantially rectangular end wall having a pair of longitudinal side walls extending down therefrom at each of two opposing longitudinal edges and a pair of transverse side walls extending down therefrom at each of two opposing transverse edges. The two transverse side walls include expansion joints which permit substantially planar deformative expansion of the transverse walls in response to manually applied pressure.

In the first embodiment, an end closure in accordance with the disclosed invention is employed in conjunction with a tear-strip package of substantially uniform rectangular cross-section. The combination of the end closure and the tear-strip package permits repeated removal and reapplication of the closure to a space-efficient package for food products.

The invention also comprises a method of manufacturing the end closure using in-mold labeling techniques wherein the walls of the end closure are integrally formed with the end wall, with discontinuities or gaps formed in the transverse side walls to permit substantially planar expansion, and a pleated label is incorporated into the end closure to span the discontinuities and function as a flexible seal and a limitation on the amount of planar expansion.

Thus, an end closure in accordance with the invention permits easy removal and reapplication to an appropriate package, maintaining a snug fit with the package to preserve freshness of the enclosed food product and may be used in conjunction with space-efficient packaging.

BRIEF DESCRIPTION OF THE DRAWINGS

FIG. 12 is a bottom perspective view of the closure of

FIG. 1 in closed position.

DETAILED DESCRIPTION OF THE PREFERRED EMBODIMENTS

Figure 1:
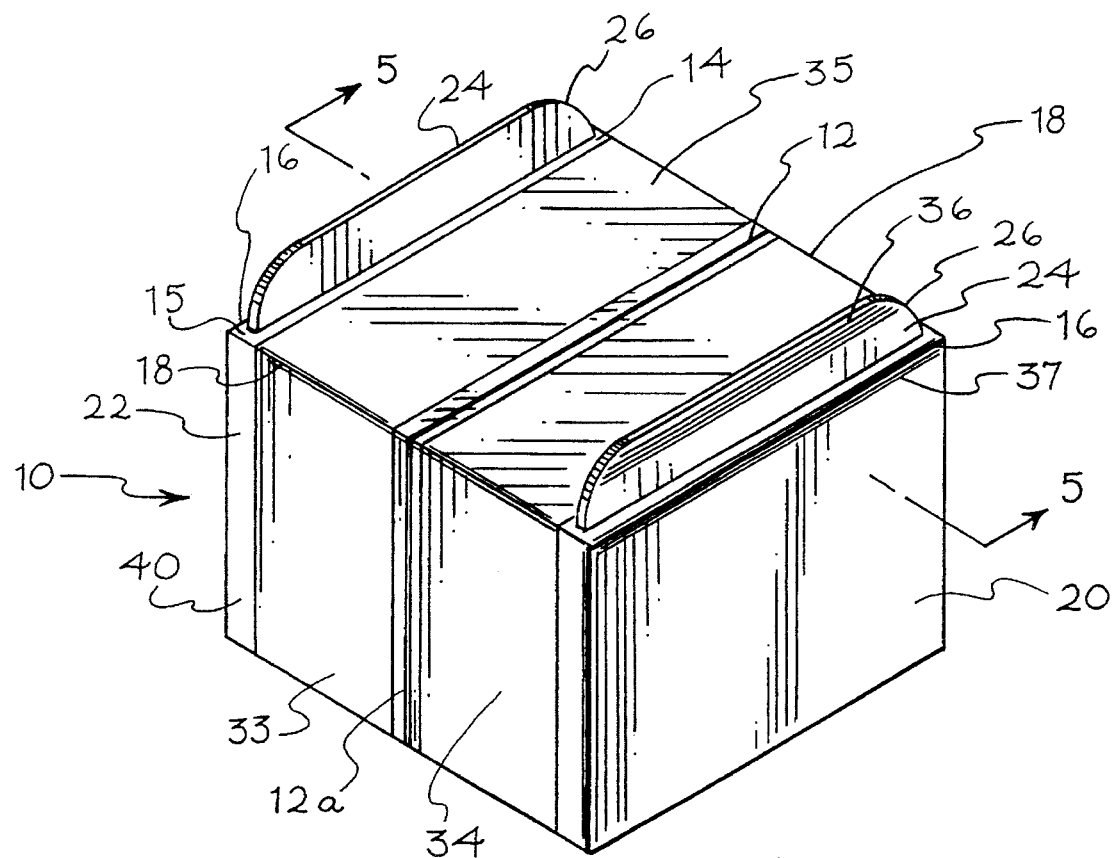
FIG. 1 is a perspective view of an end closure in closed position in accordance with a first embodiment of the invention.
Figure 3:
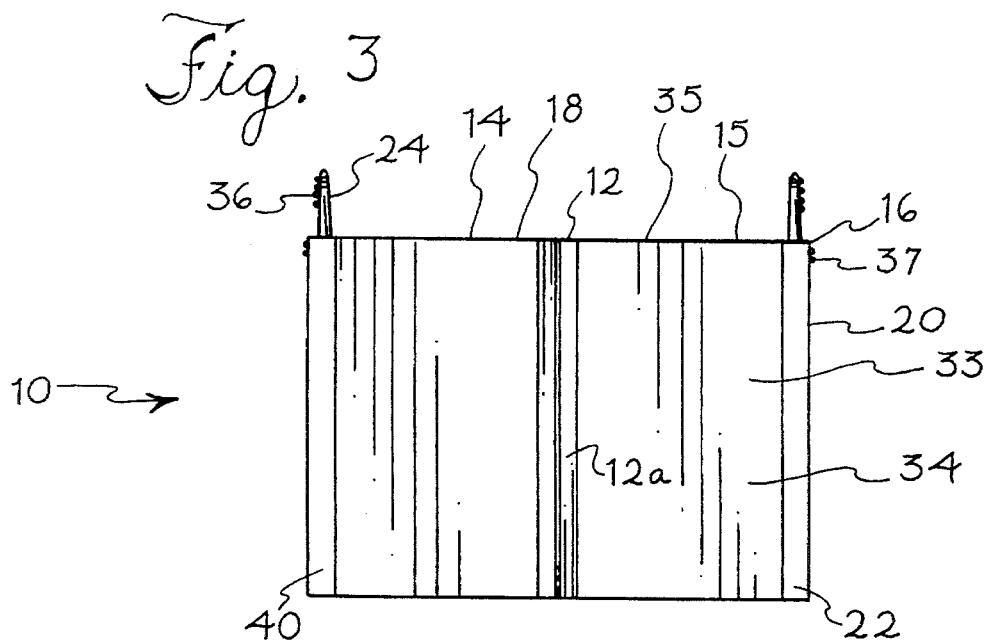
FIG. 3 is a front elevational view of the closure of FIG. 1 in closed position.
Figure 4:
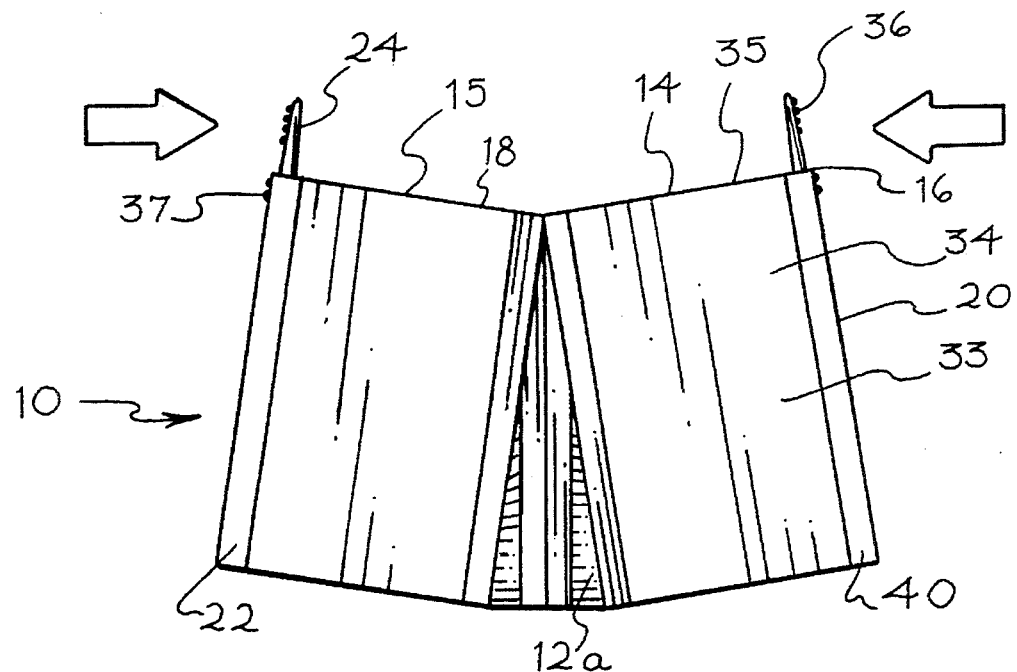
FIG. 4 is a front elevational view of the closure of FIG. 1 in open position.
Figure 2:
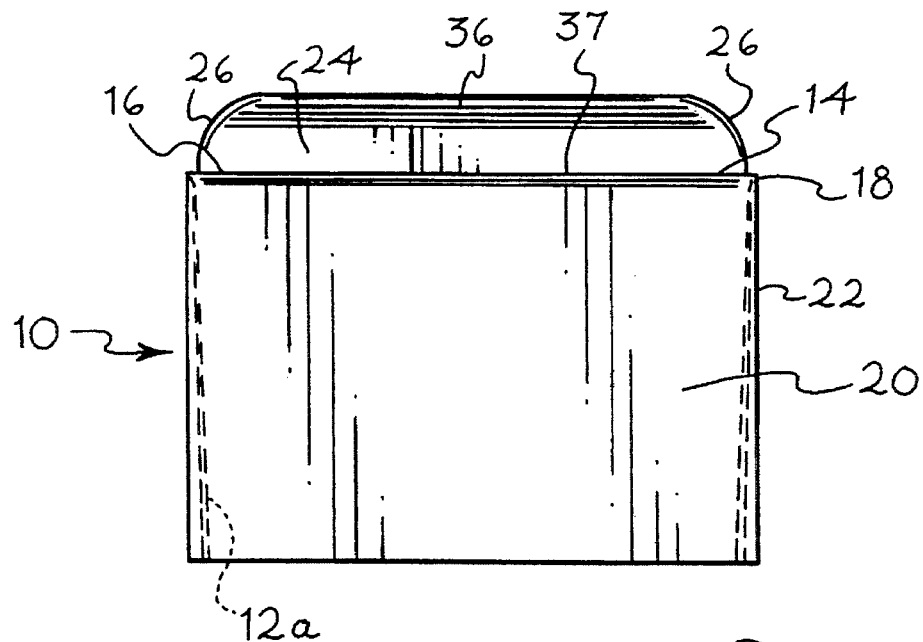
FIG. 2 is a side elevational view of the closure of FIG. 1 in closed position.

The invention is generally embodied in an end closure of substantially rectangular cross-section adapted for repeated removal from and reapplication to an appropriately sized open package, container or box. In order to facilitate removal and reapplication of the end closure to the package, the end closure is designed to respond, against a bias, to manually applied pressure by expanding, particularly at the opening of the end closure, and to subsequently constrict into its previous shape as manual pressure is relieved. In the illustrated embodiments, the end closure is adapted for repeated use with a rectangular tear-strip package, a size-adjustable package of substantially uniform rectangular cross-section having a number of detachable parallel strips of material which may be sequentially removed to monotonically decrease the volume of the remaining package. An end closure in accordance with the invention is particularly appropriate for use in conjunction with a tear-strip package to protect the contents of the package, which may comprise a food product, from the environment.

As seen in FIGS. 1–5, an end closure 10 in accordance with the invention may comprise a resilient, substantially rectangular end wall 14 having two longitudinal edges 16 and two transverse edges 18. The end wall 14 preferably permits flexure, but is not creased.

Each of the longitudinal edges 16 has a resilient longitudinal wall 20 extending downwardly from the end wall 14. Each of the transverse edges 18 has a resilient transverse wall 22 extending downwardly therefrom as far below the end wall 14 as the longitudinal walls 20. Each transverse wall 22 preferably has a downwardly opening generally U-shaped slot 32 to permit planar expansion of the transverse side walls 22 and to provide space for operation of an expandable seal member.

A thin, flexible sheet 34, which may serve as a label for the package, extends over portions of the outer surface 15 of the end wall 14 and of the outer surfaces 40 of both transverse side walls 22. The flexible sheet 34 has a pleat 12 traversing its length from one transverse side wall 22 to the other. Along the end wall 14, the pleat 12 runs approximately equidistantly from and substantially parallel to the longitudinal edges 16. Along each of the transverse side walls 22, a side portion 12a of the pleat is centrally aligned within the U-shaped slot 32 and protrudes slightly through the slot 32 into the interior of the end closure 10 to function as an expandable, flexible seal which limits expansion of the slots 32. As explained below, the side portions of the pleat 12a may expand to permit limited deformative, substantially planar expansion of the U-shaped slots 32.

The expandable pleat 12 of the first embodiment may be reasonably substituted for by another type of expandable member within each U-shaped slot 32. Within the scope of the invention, the expandable members may be integral with the transverse side walls 22 and may be themselves biased toward closure.

As seen in FIGS. 1–5, the first embodiment of the invention further comprises vertical tab sections 24, having rounded corners 26, extending upwardly from the end wall 14. The tab sections 24 are parallel to the longitudinal edges 16 and are set in slightly therefrom. Along the outer surfaces of the tabs are a series of horizontal tab ridges 36 which facilitate gripping and manually compressing the tabs 24. Similar lower ridges 37 protrude along the tops of the transverse side walls 22 to further facilitate the gripping and compressing functions as the users fingers may contact the lower ridges 37 and the tab ridges 36 simultaneously.

Figure 12:
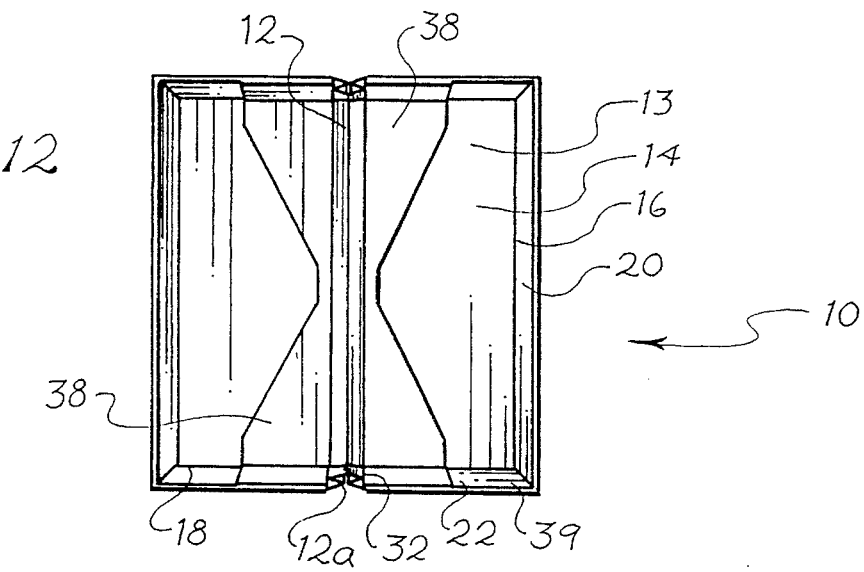
Figure 13:
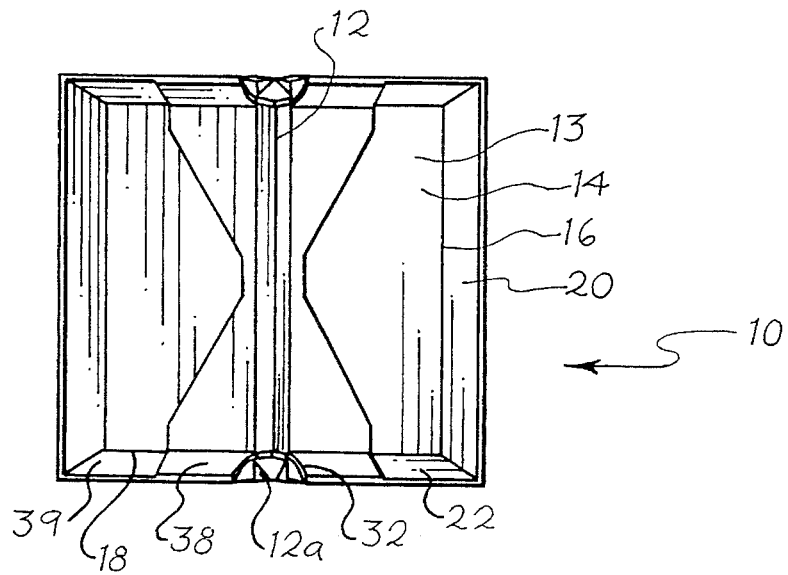
FIG. 13 is a bottom perspective view of the closure of FIG. 1 is an intermediate position.
Figure 14:
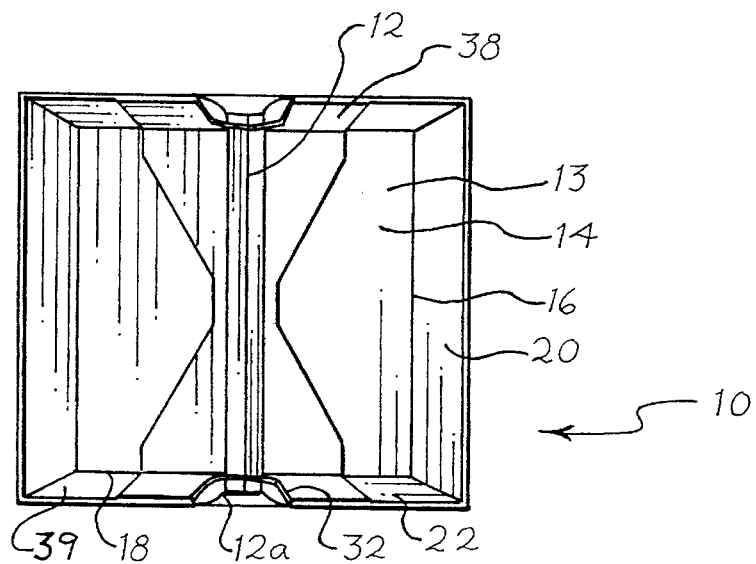
FIG. 14 is a bottom perspective view of the closure of FIG. 1 in open position.

The end closure 10, as seen from the bottom in FIGS. 12–14 has a closed position (FIG. 12) wherein all side walls are substantially perpendicular to the unflexed end wall 14, an open position (FIG. 14) wherein the expandable pleat 12 is fully expanded, the end wall 14 is fully flexed, and the longitudinal side walls 20 are relatively spaced as far apart as possible, and a continuum of intermediate positions, one of which is shown in FIG. 13. FIGS. 1, 2, 3, and 5 also illustrate the closed position while FIG. 4 demonstrates how manual relative compression of the tab sections 24 is used to place the end closure 10 into its open position. The user may easily apply such compression by placing his thumb on one tab section, placing another finger of the same hand on the other tab section, and squeezing the tabs 24 together.

In the first embodiment, manual relative compression of the tabs 24 applies a bending moment to the end wall 14. The bending moment places the transverse walls 22 in tension, causing the U-shaped slots 32 to open and the expandable pleat 12 in the flexible sheet 34 to straighten and expand inside the slots 32. The flexure of the end wall 14 correspondingly causes the longitudinal walls 20 to angularly separate to a predetermined extent, widening the opening to the end closure 10 and facilitating its application to a package.

After sliding the end closure 10 over the opening to the package 50, compression exerted by the fingers on the tabs 24 is released, and the bending resilience of the end wall 14 or the elasticity of the flexible sheet 34, or a combination of these reactive forces closes the end closure 10 around the sides of the package 50, effectively protecting the food product 70 from the environment.

In the first embodiment of the invention, the bending resilience of the end wall 14 provides the majority of reactive force. To add strength to the end closure 10 and control deformation near the center of the end wall 14 and the U-shaped expansion slots 32, the end closure 10 preferably includes a stiffener 38 extending centrally along the transverse walls and end wall as seen in FIGS. 5 and 12–14. On the end wall 14, the stiffener 38 is preferably centered longitudinally about the pleat, and has an hourglass shape. On the transverse walls 22, the stiffener 38 is generally rectangular, extending along the sides of the U-shaped expansion slots 32. The stiffener 38 preferably comprises an integral region of increased thickness molded in the end closure.

Figure 8:
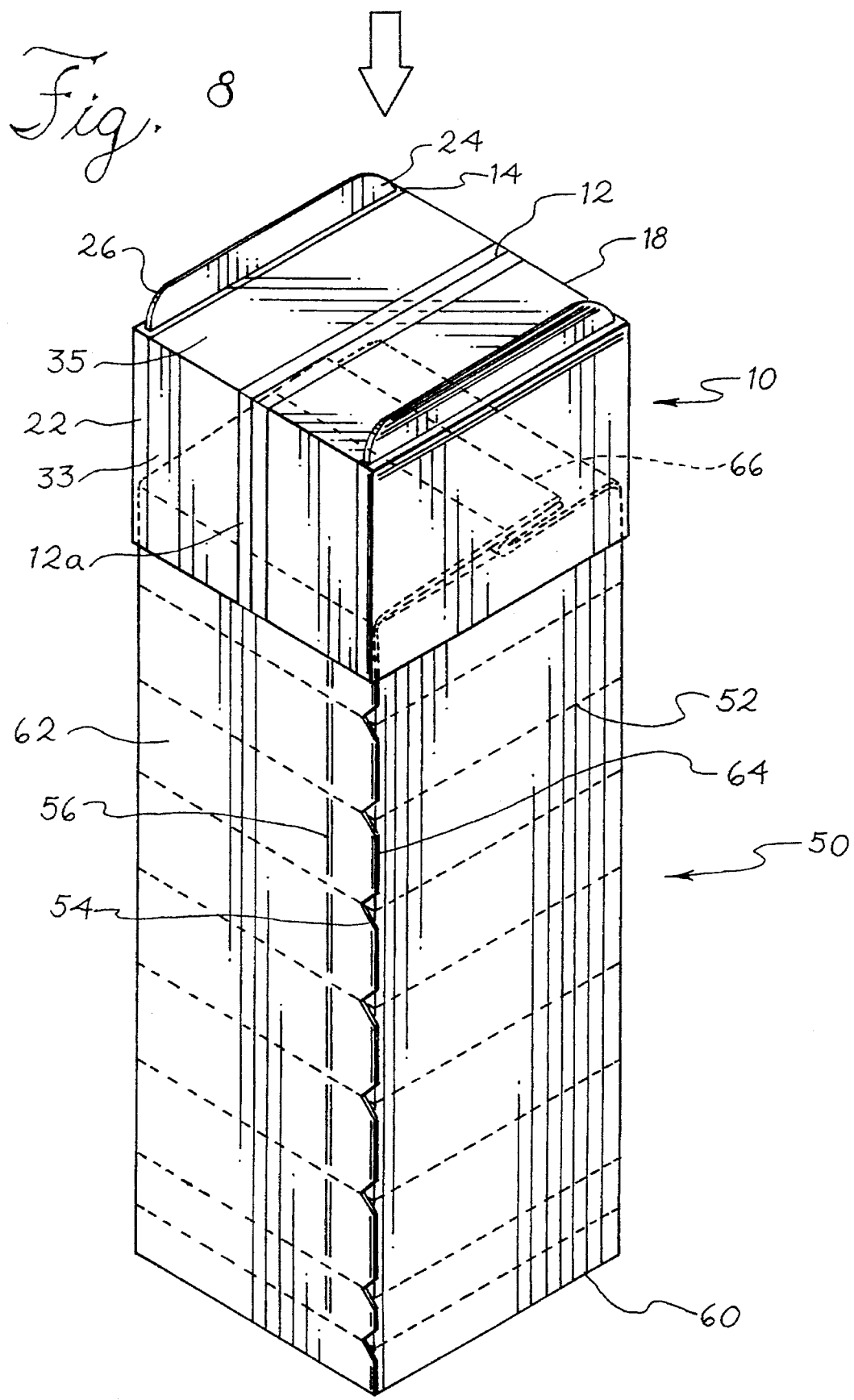
FIG. 8 is a perspective view of the closure of FIG. 1 being placed over the unopened end of a tear-strip package.

The illustrated end closure is particularly appropriate for use in combination with a tear-strip package 50, as illustrated in FIG. 8. The tear-strip package 50 is a size-adjustable package of substantially uniform rectangular cross-section having a number of detachable parallel strips of material comprising tear-strips 62 which may be sequentially removed to monotonically decrease the volume of the remaining package 50.

The tear-strips 62 are defined by parallel rows of perforations 52 extending around the package 50 to overlap themselves adjacent one of the corner edges of the package 50. Reducing the size of the tear-strip package 50 entails manually pulling a tab end 64 angularly away from the package 50 at a corresponding tab base 56, and then peeling off the connected tear-strip 62 around the perimeter of the package 50. Manually pulling the tab end 64 away from the package 50 is facilitated by tab corners 54 which make the tab end 64 easier to grasp.

The end closure 10 fits over the open end of the package 50 after any number of the tear-strips 62 is removed, even as the package decreases in volume, because the cross-section remains substantially uniform. In the embodiment of the tear-strip package 50 illustrated in FIGS. 8 and 10, the closure 10 fits over the squarish end parallel to the planes defined by the perforations 52. The elastic bias toward closing of the end closure 10 maintains a tight fit with respect to the sides of the package 50.

Figure 9:
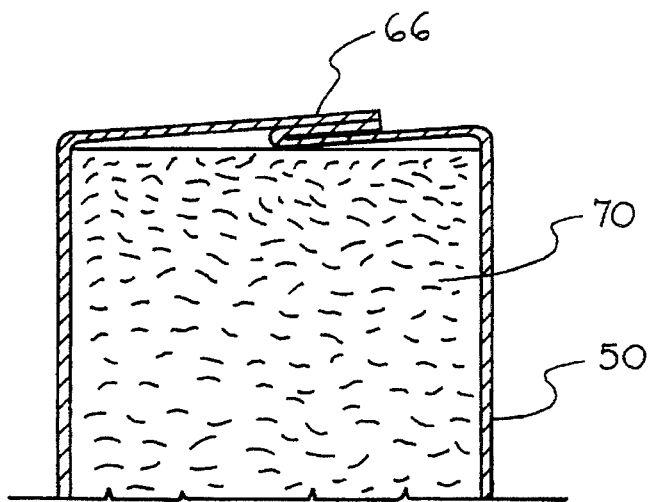
FIG. 9 is a sectional view of the unopened end of the tear-strip package of FIG. 8.
Figure 11:
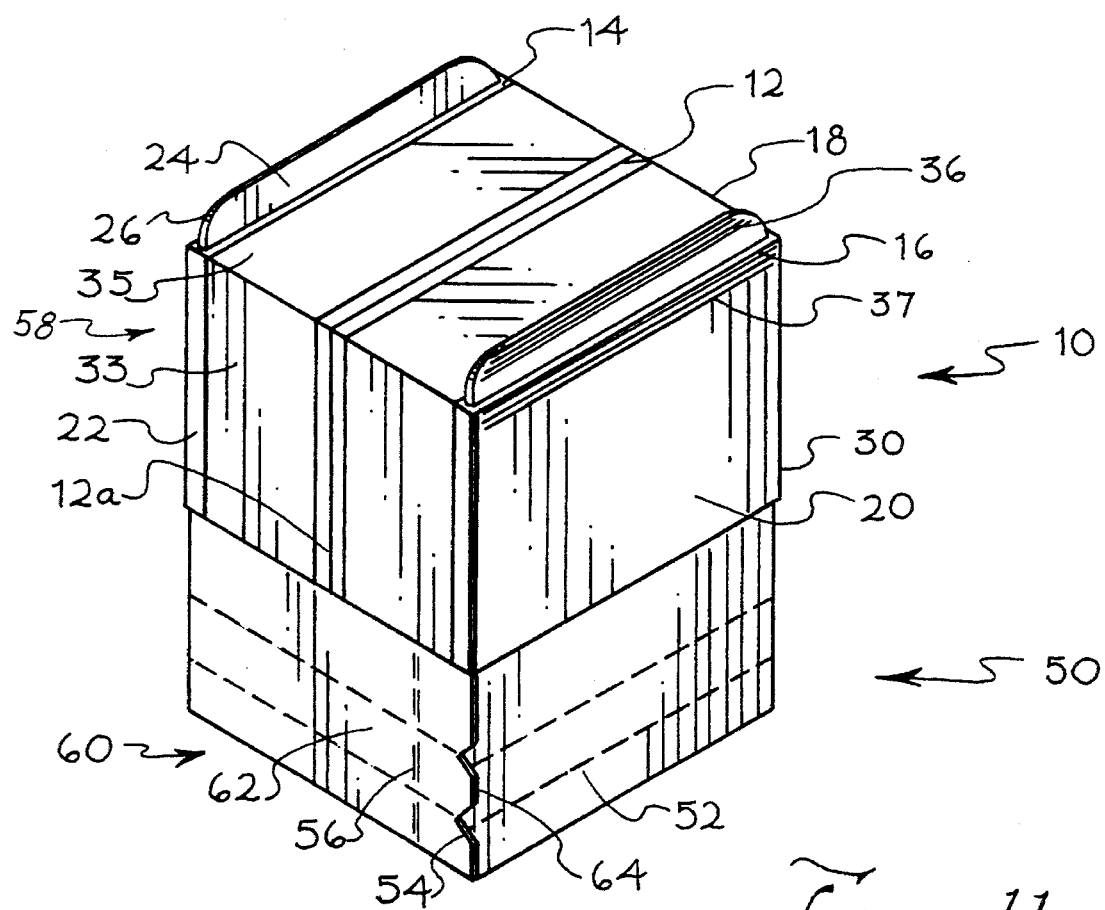
FIG. 11 is a perspective view of the closure of FIG. 1 placed over the open end of the tear-strip package of FIG. 10 after several of the tear strips have been removed.
Figure 10:
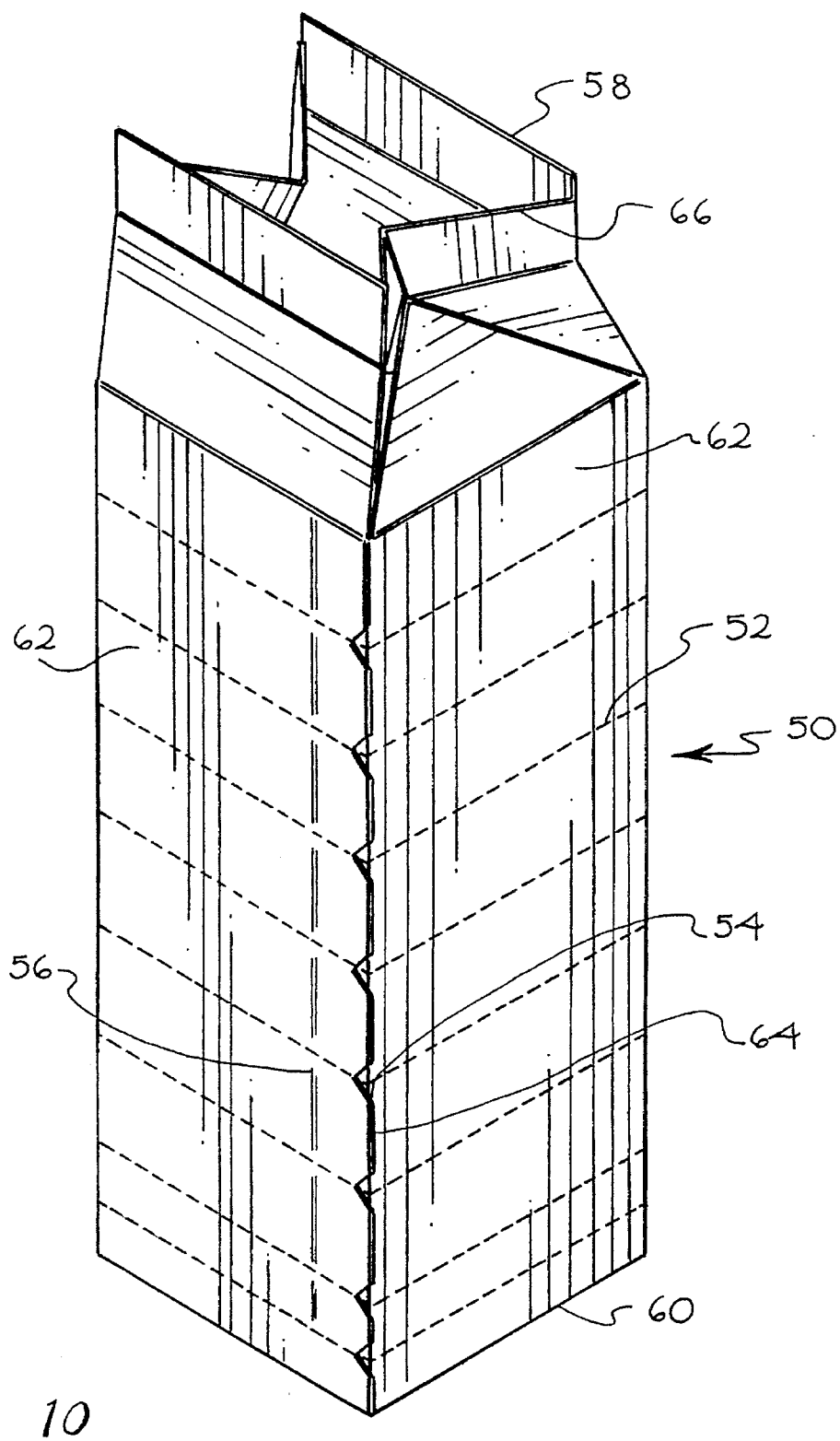
FIG. 10 is a perspective view of the tear-strip package of FIG. 8 with the top unfolded and opened.

The tear-strip package 50 initially has a closable folding lid 66, configured similarly to that of a milk carton. It is folded flat, closed and sealed, as shown in FIGS. 8 and 9, after the food product 70 is initially inserted into the package 50. To initially open the package 50, one may unfold the lid 66, as seen in FIG. 10, or one may peel one or more of the tear-strips 62, subsequently removing the lid 66. Thereafter, the end closure 10 may be applied to the package 50.

The package 50 may vary considerably in size, but in the illustrated embodiment, the package 50 approximates a rectangular parallelepiped of 7 in.×2¾ in.×2¾ in. when the lid is folded closed, and is used as a container for 2 pounds of pasteurized processed cheese food. Each of the tear-strips 62 has a width of approximately ⅞ in., except that the bottom tear-strip is about ½ in wide. The end closure 10 is dimensioned to fit over the end of the package as described above, and in the illustrated embodiments is approximately 2 in. high, excluding the tabs 24. In the above-described embodiment of the invention, the tabs 24 preferably extend ¼ to ½ in. above the end wall 14.

Figure 6:
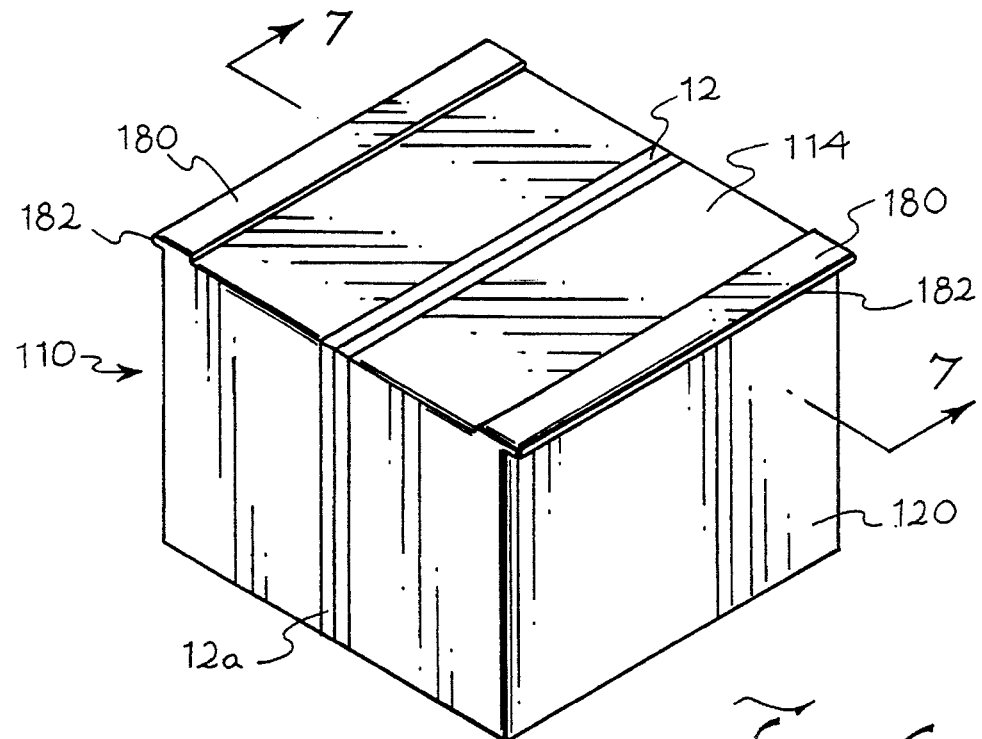
FIG. 6 is a perspective view of a closure in closed position in accordance with a second embodiment of the invention.
Figure 5:
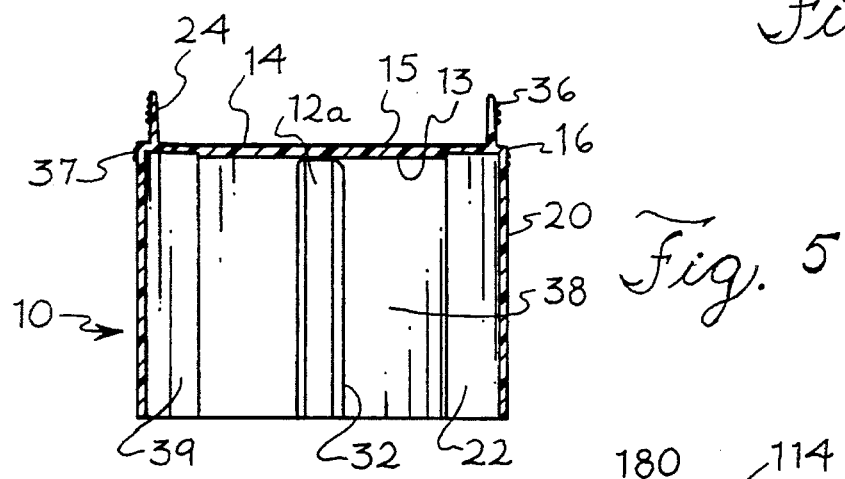
FIG. 5 is a sectional view of the closure of FIG. 1 taken substantially along the line 5—5 in FIG. 1.
Figure 7:
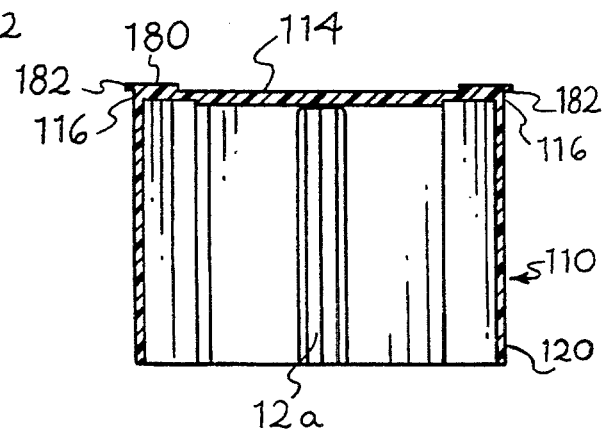
FIG. 7 is a sectional view of the closure of FIG. 6 taken substantially along the line 7—7 in FIG. 6.

An end closure 110 in accordance with a second embodiment of the invention is shown in FIGS. 6 and 7. The end closure 110 is substantially similar to the end closure 10 described above except that, instead of having tabs extending perpendicular to the end wall, the closure 110 has tabs 180 along each of the longitudinal edges 116 of the end wall 114 extending slightly beyond the longitudinal side walls 120 and perpendicular thereto, forming protruding ledges 182.

To open the end closure 110, the user may exert a bending moment on the end wall 114 by placing his thumb and middle finger under opposite protruding tabs 180, and then pressing his index finger against the end wall 114, preferably near the center. To permit the end closure 110 to close, the user relaxes the pressure exerted by his index finger against the end wall 114 and the resilience of the end wall 114 reacts to close the end closure 110.

The second embodiment may have a stiffener similar to that of the first embodiment, and the dimensions of the second embodiment of the closure are similar to those of the first embodiment. The ledges 182 preferably extend less than ¹⁄₁₆ in. beyond the longitudinal side walls 120.

In either embodiment, the resilient material used to form the end wall and the side walls may be a plastic, such as polypropylene. The thin, flexible sheet may also be a plastic such as polypropylene, but a considerable range of other materials may also be used.

Figure 15:
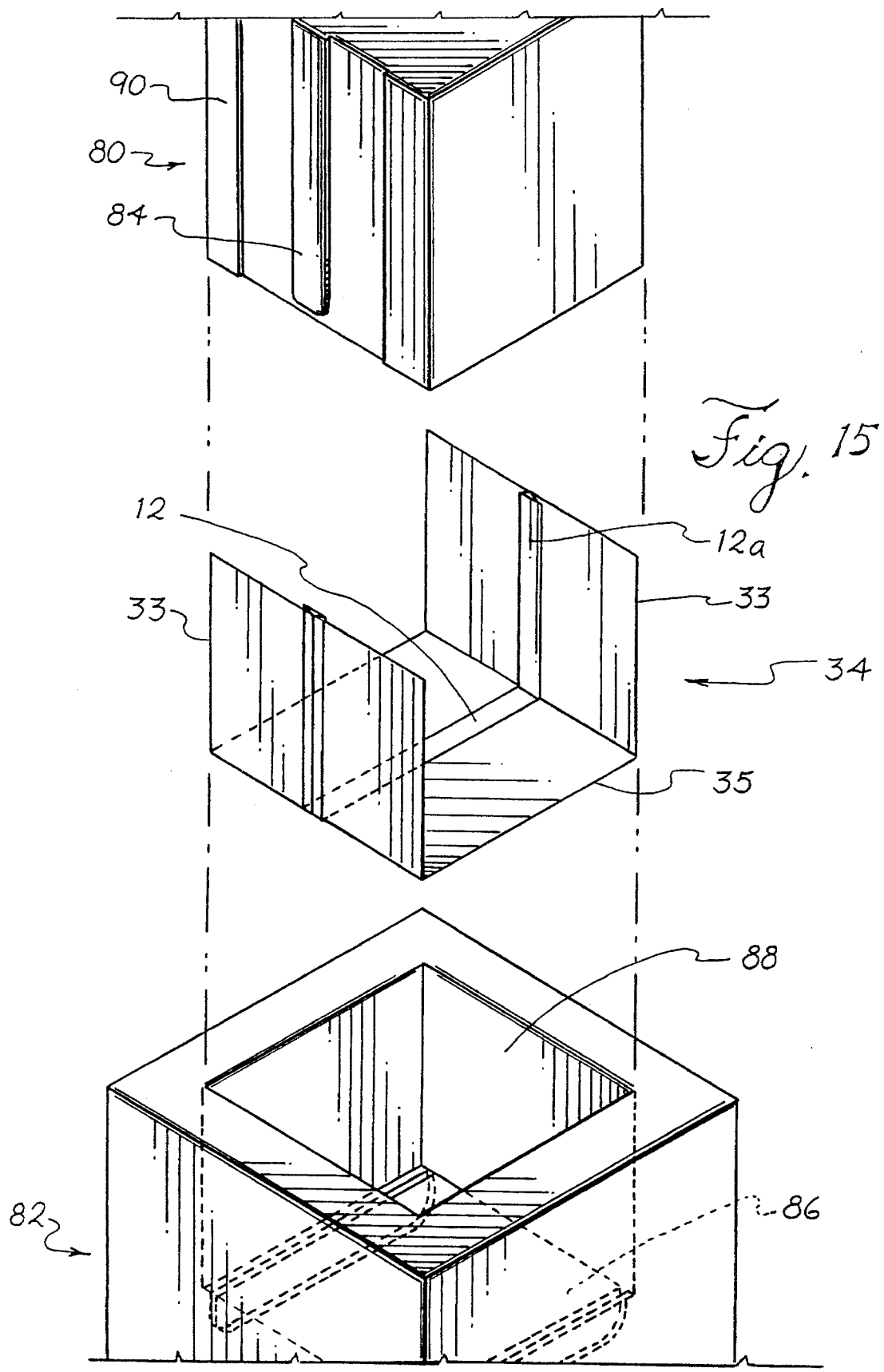
FIG. 15 is a diagrammatic exploded perspective view of a male/female die and label for use in accordance with the method of the invention.

The invention also comprises a method of manufacturing the end closure 10. The end closure 10 is preferably formed through an in-mold labeling process, schematically represented in FIG. 15, wherein the pleated flexible sheet 34, which may serve as a product label, is inserted into a female forming die component 82 such that the center panel 35 of the flexible sheet 34 covers a portion of the bottom surface 86 of the female die component 82 and the side panels 33 of the flexible sheet 34 rest against the transverse side walls 88 of the female die component 82. The flexible sheet 34 is preferably held in place, flush against the female die component 82, by vacuum suction from small holes placed in the appropriate surfaces of the female die component 82. The male die component 80 is then inserted into the female die component 82; and an appropriate plastic material such as a polymeric resin is injected in liquid form and cured. Raised, generally U-shaped regions 84 on the transverse sides 90 of the male die component 80 contact the pleated regions 12a of the side panels 33 of the label 34 to prevent the resin from flowing into contact with the pleats, resulting in the formation of the U-shaped slots 32.

All other regions of the label are preferably contacted by the resin and become securely adhered to the end wall and transverse side walls of the closure during the molding process. The label may become integral with the material injected into the mold, and may be made of the same material.

While in-mold labeling is known in the prior art, insofar as it is known in the prior art to place a label in a mold so that a container is formed in the mold with a label in place, the particular in-mold labeling process described herein is believed to be novel, particularly in regard to the inclusion of a label having a fold or pleat which functions as an expandable flexible seal, as described above.

The package and end closures described above may be used for a food product such as cheese spread or other cheese products. A convenient method of filling packages with certain cheese products is hot-filling, as is known in the art. For such an application, the inside surface of the tear-strip package may be coated with an anti-stick layer or release agent to permit the tear strips to easily pull away from the cheese product along the perforations. The illustrated container may be hot-filled with the top in the open position shown in FIG. 10, and may then be sealed with the top folded down to the closed position shown in FIG. 9.

To remove cheese product from the package, a predetermined length of package may be opened by lifting and peeling the appropriate tear strip, thereby separating a segment of the package and exposing the cheese product underneath. An appropriate cutting device, such as a knife or a cheese slicer, may then be employed to sever the exposed segment or a smaller quantity of cheese product. The end closure may then be placed or replaced over the open end of the package, covering the exposed cheese product as well.

From the foregoing, it will be appreciated that the invention provides a novel and useful end closure and method of manufacture therefor. The invention is not limited to the particular embodiment described above or to any particular embodiment. Terms such as "horizontal," "vertical," "above" "below," etc., to the extent that they are used herein, refer only to the orientation of the various components relative to one another, when the closure, package or die components are in an upright position as shown in the drawings. It should be understood that the closure can be applied in various different orientations and that the in-mold labeling method can be employed with dies in various different orientations, and the use of these terms is not intended to imply otherwise, nor to limit the description or claims to an end closure disposed in a particular orientation or to a method performed by components particularly oriented in a global sense.

What is claimed is:

1. An end closure for reclosable food packages, said end closure having an open position facilitating application of said end closure to said packages and removal therefrom, and a closed position permitting said end closure to fit snugly on said packages, said end closure comprising:

a substantially rectangular end wall having an inner surface and an outer surface, said end wall having a pair of opposing longitudinal edges and a pair of opposing transverse edges;

a pair of longitudinal side walls having inner and outer surfaces, each of said longitudinal side walls extending substantially perpendicularly to said end wall along one of said longitudinal edges; and a pair of transverse side walls having inner and outer surfaces, each of said transverse side walls extending substantially perpendicularly to said end wall along one of said transverse edges;

said transverse side walls adjoining said longitudinal side walls;

said transverse side walls having expansion joints to permit planar expansion of said transverse side walls and corresponding relative displacement between said longitudinal side walls, thus permitting said end closure to move between said open position and said closed position;

a pair of tabs extending substantially perpendicularly from said end wall to facilitate the application of said end closure to said package by effecting planar expansion of said transverse side walls and corresponding relative displacement of said longitudinal side walls to move said end closure from said closed position to said open position in response to manual relative compression of said tabs, wherein said tabs have a plurality of parallel ridges on the surface thereof for facilitating the application of manual relative compression of said tabs.

2. An end closure in accordance with claim 1 further comprising a flexible sheet bonded over said outer surface of said end wall and said outer surfaces of said transverse side walls, said flexible sheet having a pleat aligned within said expansion joints in said transverse side walls, said pleat permitting expansion of said flexible sheet within said expansion joints.

3. An end closure in accordance with claim 2 wherein said expansion joints comprise generally U-shaped slots.

4. An end closure in accordance with claim 3 wherein said pleat is disposed partially within said U-shaped slots and said pleat is substantially aligned with the central axis of said U-shaped slot.

5. An end closure in combination with a size-adjustable package, whereby said end closure may be applied to substantially close said size-adjustable package, said size-adjustable package comprising a plurality of detachable parallel strips of packaging material which may be manually removed to monotonically decrease the size of the package, said end closure having an open position facilitating application of said end closure to said package and removal therefrom, and a closed position permitting said end closure to fit snugly on said package, said end closure comprising:

a substantially rectangular end wall having a pair of opposing longitudinal edges and a pair of opposing transverse edges;

a pair of longitudinal side walls, each of said longitudinal side walls extending substantially perpendicularly to said end wall along one of said longitudinal edges; and a pair of transverse side walls having inner and outer surfaces, each of said transverse side walls extending substantially perpendicularly to said end wall along one of said transverse edges;

said transverse side walls adjoining said longitudinal side walls;

said transverse side walls having expansion joints to permit planar expansion of said transverse side walls and corresponding relative displacement between said longitudinal side walls, thus permitting said end closure to move between said open position and said closed position;

a pair of tabs, said tabs extending substantially perpendicularly from said end wall to facilitate the application of said end closure to said package by effecting planar expansion of said transverse side walls and corresponding relative displacement of said longitudinal side walls in response to manual relative compression of said tabs, wherein said tabs have a plurality of parallel ridges on the surface thereof for facilitating the application of manual relative compression of said tabs.

6. A combination in accordance with claim 5 further comprising a flexible sheet bonded over said outer surface of said end wall and said outer surfaces of said transverse side walls, said flexible sheet having a pleat aligned with said expansion joints in said transverse side walls, said pleat permitting expansion of said flexible sheet adjacent said expansion joints.

7. A combination in accordance with claim 6 wherein said expansion joints comprise generally U-shaped slots.

8. A combination in accordance with claim 7 wherein said flexible sheet has a pleat protruding through said U-shaped slots.

* * * * *